(12) United States Patent
Richter et al.

(10) Patent No.: US 7,478,670 B2
(45) Date of Patent: Jan. 20, 2009

(54) MODULAR SYSTEM FOR A 1-TO-4 ZONE CLIMATE CONTROL SYSTEM FOR VEHICLES

(75) Inventors: Gerald Richter, Aachen (DE); Thomas Ehlers, Krefeld (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 649 days.

(21) Appl. No.: 11/173,259

(22) Filed: Jul. 1, 2005

(65) Prior Publication Data
US 2006/0151161 A1    Jul. 13, 2006

(30) Foreign Application Priority Data
Jul. 2, 2004    (DE) .................. 10 2004 033 402

(51) Int. Cl.
*B60H 1/00*    (2006.01)
*B60H 3/00*    (2006.01)
*F25B 29/00*    (2006.01)

(52) U.S. Cl. .................. 165/203; 165/42; 165/43; 165/76; 165/137; 237/12.3 A; 454/156; 454/160; 454/161; 454/121; 454/126

(58) Field of Classification Search ............. 165/203, 165/42, 43, 76, 137; 454/121, 126, 156, 454/160, 161; 237/12.3 A, 12.3 B
See application file for complete search history.

(56) References Cited

U.S. PATENT DOCUMENTS

| 5,016,704 | A  | * | 5/1991 | Ono ........................ 165/203 |
| 5,775,407 | A  | * | 7/1998 | Inoue ........................ 165/42 |
| 5,862,677 | A  | * | 1/1999 | Kim et al. .................. 165/42 |
| 6,581,678 | B1 | * | 6/2003 | Groemmer et al. ......... 165/42 |
| 6,607,029 | B2 | * | 8/2003 | Danieau .................... 165/203 |
| 6,685,554 | B2 | * | 2/2004 | Abouchaar ................ 454/121 |
| 6,994,157 | B1 | * | 2/2006 | Arold ....................... 165/203 |
| 7,331,851 | B2 | * | 2/2008 | Koukouravas ............. 454/160 |

FOREIGN PATENT DOCUMENTS

| DE | 198 11 548 A1 | 10/1998 |
| DE | 198 11 452 C1 | 4/1999 |

* cited by examiner

*Primary Examiner*—John K Ford
(74) *Attorney, Agent, or Firm*—Brinks Hofer Gilson & Lione

(57) ABSTRACT

A modular system for a 1-to-4 zone climate control system for vehicles, which is provided with at least one housing and several air tempering and air distribution devices including a fan, optionally a filter, an evaporator, a heater and several doors arranged at a partition that is placed orthogonal to the evaporator and provided to divide the total volume flow into two partial volume flows for the left and right vehicle sides. In the first configuration the partition is provided with several blind fittings for the closing of the flow paths associated with air outlets and air channels of a second configuration. In the second configuration, the blind fittings are replaced with additional doors enabling the use of the air outlets and air channels of additional zones.

9 Claims, 4 Drawing Sheets

MODULAR SYSTEM FOR A 1-TO-4 ZONE CLIMATE CONTROL SYSTEM FOR VEHICLES

BACKGROUND

1. Field of the Invention

The invention relates to a modular system for a 1 to 4-zone climate control system for vehicles.

2. Related Technology

Air conditioning of vehicles not only serves to meet the comfort requirements of the passengers, but also to enhance safety of road traffic. Thermal comfort in vehicles is quite different from that in buildings. Due to location of the window areas in the upper half of the vehicle, heat radiation, for example, changes dramatically from the head to the foot region.

Particularly high temperatures in the passenger compartment are to be considered critical with respect to the driving condition. In addition to the basic tasks of a climate control system to deliver, clean, temper, dehumidify and distribute air, the special tasks consist in avoiding draught, reducing perspiration of the passengers and maintaining constant a comfort range with respect to temperature and humidity.

Frequently, because of the increased physical strain on the driver, there is a demand when several passengers sit in the vehicle to create a different climate zone for each individual passenger. While in the past 1-zone and 2-zone climate control systems were used for air conditioning vehicles, recent development and introduction of 3-zone and 4-zone climate control systems, or multi-zone climate control systems have been seen.

Whereas the 1-zone and 2-zone climate control systems have symmetric or asymmetric, compact configurations dependent on the installation space available in the vehicle, it is inherent to the multi-zone climate control systems that they are additionally distributed in the vehicle. Thus, the climate control system consists of two air conditioning devices that are at least partly coupled to each other. Such distributed multi-zone climate control systems that include a front air conditioning device and a rear air conditioning device are predominantly used in high-end luxury cars. These distributed climate control systems are very expensive and require much space for installation. Moreover, production and stockholding of differently configured air tempering and air distribution devices require high efforts and, therefore, result in considerable manufacture costs.

For the above reasons, these multi-zone climate control systems are not found in compact or small cars.

It is the object of the invention to develop a compact multi-zone climate control system that, despite a small installation space, can be especially efficiently manufactured with the number of air distribution and temperature zones desired by the customer.

SUMMARY

According to the invention, a modular system for the design of a 1-zone to 4-zone climate control system for vehicles is provided that contains only one single housing and several air tempering, air guiding and air distribution devices. These devices are arranged within the housing and include a fan, several channels, optionally a filter, an evaporator, a heater, as well as several doors arranged at a partition that is placed orthogonal to the evaporator and is provided to divide the total volume flow into two partial volume flows for the left and right vehicle sides.

All air tempering and air distribution devices are placed within one housing and when used in a 1-zone and 2-zone climate control system, the partition is provided with several blind fittings for the closing of the flow paths associated with air outlets and air channels of further air distribution and temperature zones. In a 3-zone and 4 zone system, instead of the blind fittings, additional doors are provided for use of the air outlets and air channels for further air distribution and temperature zones.

In a 1-zone and 2-zone climate control system a defroster door, a temperature door, a console door and a rear compartment door are used as doors. In a 3-zone and 4-zone climate control system however, for air outlets and air channels of further air distribution and temperature zones a temperature door for the rear compartment, air distribution doors for the rear compartment and air distribution doors for additional outlets are provided.

The idea of the invention is also maintained, if additional or a smaller number of doors to supply the different air distribution and temperature zones are used.

As meant by the invention, the evaporator and the heater, possibly with an additional PTC-heating element, are referred to as air tempering devices; the channels within the climate control system and between the climate control system and the air outlets as air distribution devices; and all doors, for example, ventilation and temperature doors, as air guiding devices.

The invention can use an existing housing, in order to further develop a 1-zone climate control system into a multi-zone climate control system completed by further air guiding devices. The multi-zone climate control system according to the invention is created in that only the partition is exchanged and some doors are added, with the air tempering devices, such as the evaporator, kept unchanged.

A significant advantage of this invention is that, for the modular design of a 1-zone to 4-zone climate control system, a considerable number of identical air tempering and air distribution devices can be used so that the parts variety and storage of spare parts can be considerably reduced compared to the state-of-the-art.

Another advantage of this invention is that all air tempering and air distribution devices are placed within one housing in the area below the instrument panel. This considerably simplifies the manufacture of the housing of the climate control system and make the multi-zone climate control system of the invention suitable for vehicles with only a restricted installation space.

Independent of the configuration of the zones of the climate control system, the housing is configured completely identical. For the specific zone configuration of the climate control system, only a small number of air guiding devices coupled to the partition are added or removed at the factory in order to meet the expectations of the potential customers.

The housing of the multi-zone climate control system includes three housing portions, namely two housing halves configured essentially symmetric to each other for the left vehicle side and the right vehicle side and a water drain housing placed below both housing halves. Both housing halves guide and hold the partition, which is placed orthogonal on the heater, on both sides in assembled condition.

The partition of a 1-zone and 2-zone climate control system is different from a partition of a 3-zone and 4-zone climate control system in that the partition of a 1-zone and 2-zone climate control system (in addition to the blind fittings) also contains door bearings and the 3-zone and 4-zone climate control system (instead of the blind fittings) is provided with further door bearings for additional doors.

The blind fittings are detachable fastened to the partition, or formed as portions of or at this partition. Blind fittings can close channels or openings. According to the one aspect of the invention, blind fittings are preferably configured wing-like and extend beginning from the partition into each of the left and right housing halves.

To configure a 3-zone and 4-zone climate control system, according to the invention, further air distribution devices are arranged at the partition, in order to create different climate zones for the front and the rear regions within the passenger compartment. A console comfort door is used, in order to exploit an additional possibility of comfort adjustment in form of the limitation of the air outflow velocity.

The partition of a 1-zone and 2-zone climate control system and the partition of a 3-zone and 4-zone climate control system are, thus, configured identical except the blind fitting areas.

Complementary stops arranged at the inner wall of the housing are assigned to all air distribution devices. The stops necessary for the closed state of the air distribution devices are configured such that very small wrong circulation flows enter the closed flow path. In the region of contact to the stops, the air distribution devices are suitably provided with sealing lips or similar sealing elements.

All doors are structured of two door wings configured symmetric to each other, with rotational axes for the left and right vehicle sides. The rotational axes of both door wings are supported in the region of their axial ends at the inner wall of an associated housing half and the partition orthogonal to the partition.

Therefore, both door wings of the door are controllable independent of each other and hence, configured rotatable relative to each other. In order to reduce the number of air distribution and temperature zones, both door wings of a door can be coupled to each other by means of connection elements. This coupling is realized in such a way that the connection element passed through openings in the partition is connected to both door wings.

Further, it is particularly advantageous that, independent of the number of zones, the climate control system is provided with doors configured identical when serving the same purpose. That means that a temperature door used for the central warm air/cold air adjustment can be used for a 1-zone climate control system and for a 4-zone climate control system as well. Here the advantage already mentioned of the invention becomes especially evident to persons familiar with the state-of-the-art, for by use of a plurality of identical parts the production process and the logistics can be designed much more efficient.

In 1-zone and 2-zone climate control systems the blind fittings close the flow paths of those air channels of the air distribution system that are needed to supply the air outlets of a 3-zone and 4-zone climate control system, i.e., the channels for the supply of the rear row of seats. In the 3-zone and 4-zone climate control systems, therefore, all air outlets and air channels functioning to supply the air outlets are unblocked. To configure a 1-zone climate control system, however, selected door wings of a door are coupled with said connection elements in order to reduce the air distribution and temperature zones.

The mentioned multi-zone climate control system can be operated independently of the refrigerant used in the refrigerant circuit. Further the multi-zone climate control system of the invention is suitable for a waterside temperature control with a variable refrigerant volumetric flow rate and for an airside temperature control with constant volumetric flow rate.

One or more features and advantages of the invention over the state-of-the-art essentially are: the air tempering and air distribution devices of a 1-zone to 4-zone climate control system can be arranged to be located in one housing; compact and cost effective; for the configuration of a multi-zone climate control system from a 1-zone climate control system it only needed to exchange a partition, to provide further doors at the new partition, and to provide coupling of the door wings of a door by means of a connection element.

BRIEF DESCRIPTION OF THE DRAWINGS

Further features and advantages of the invention will become evident to persons familiar with the state-of-the-art from the following detailed description of a preferred embodiment with reference to the associated drawings of which shows.

DETAILED DESCRIPTION

Figure 1:
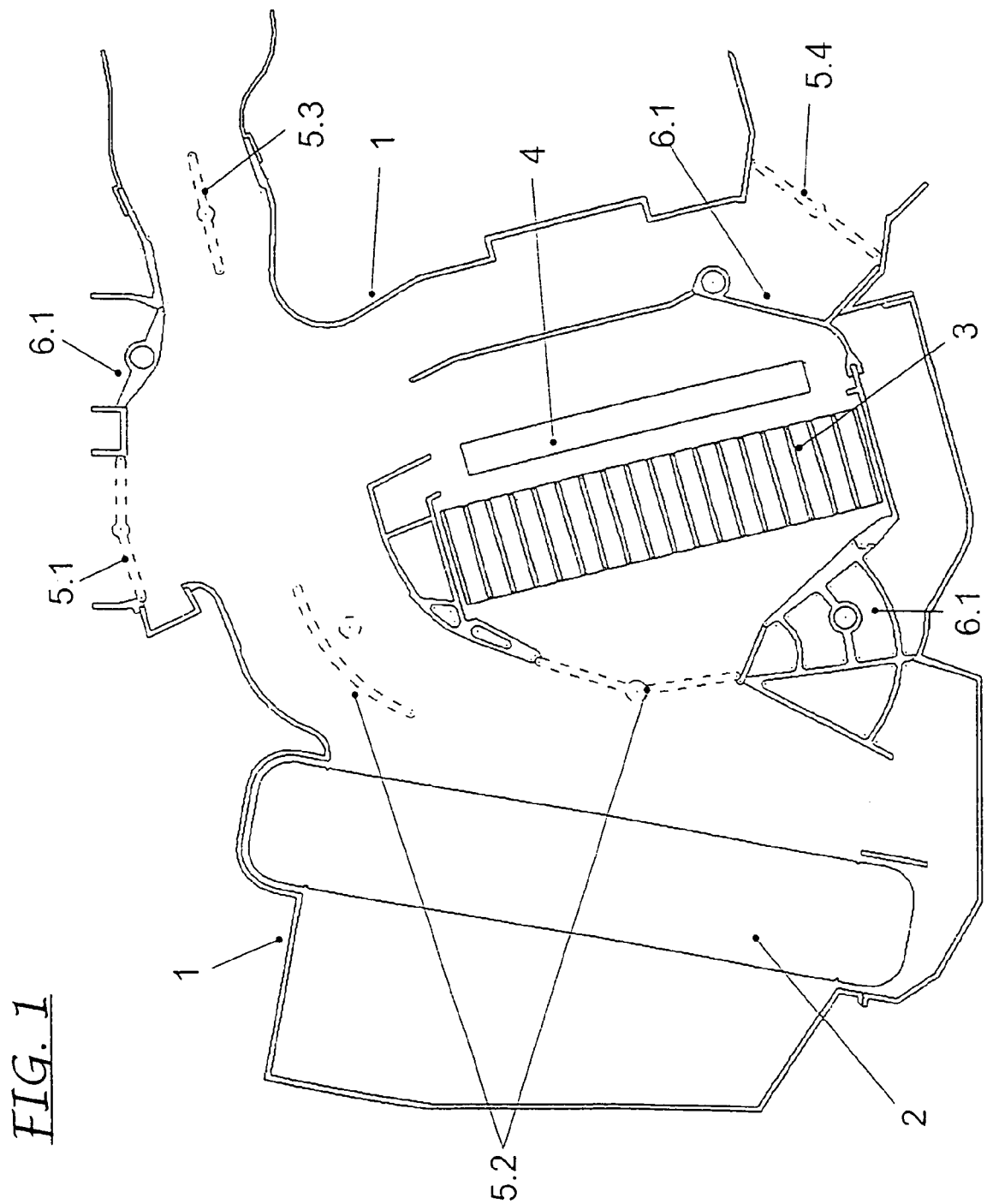
FIG. 1 is a cross-section of a 1-zone and 2-zone climate control system.
Figure 3:
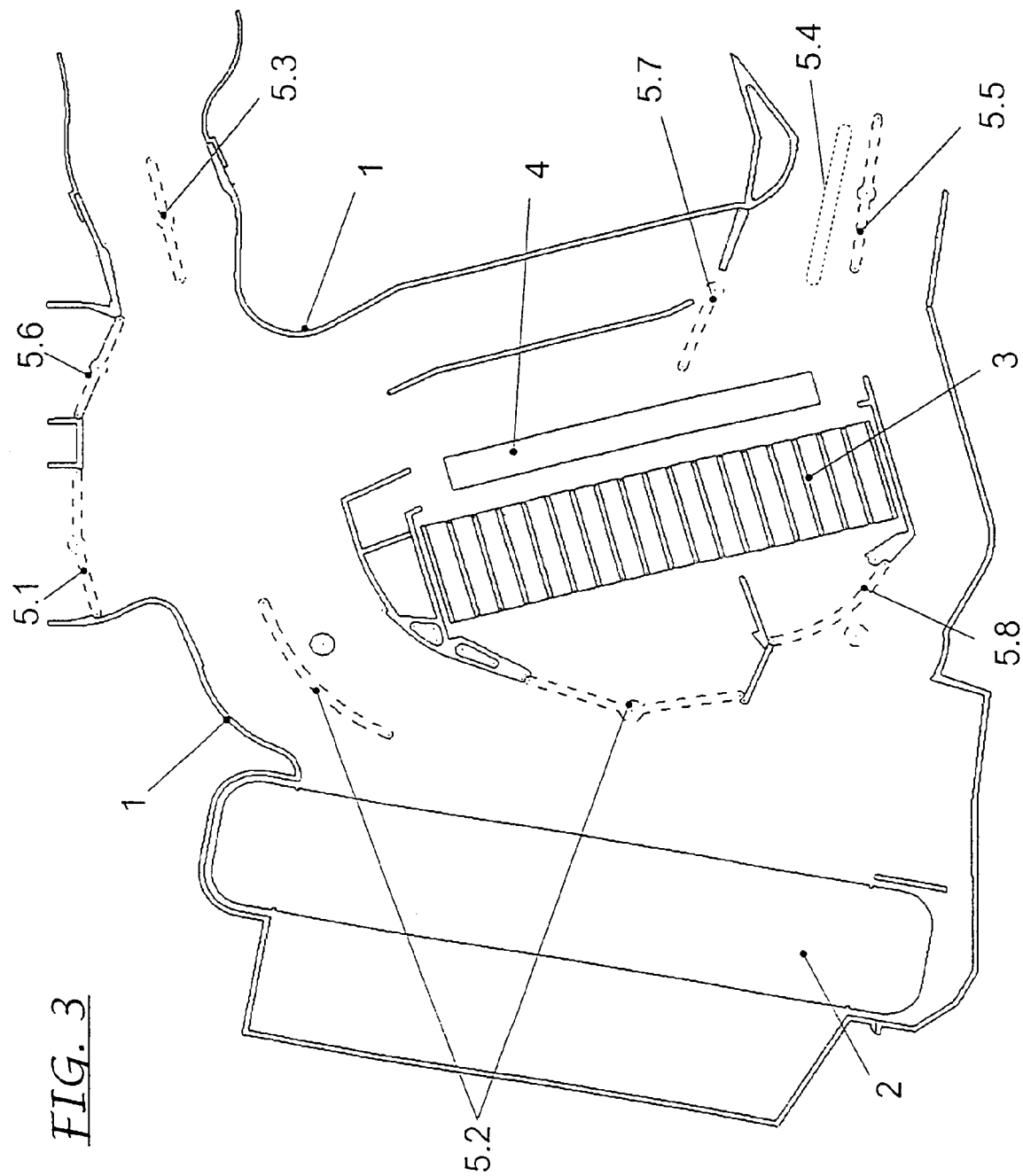
FIG. 3 is a cross-section of a 3-zone and 4-zone climate control system.

It should be noted that because of the essentially symmetric configuration of both housing halves 1, in the cross-sections represented in FIGS. 1 and 3 only one half 1 of the housing, with the associated air tempering, air guiding and air distribution devices, is shown.

FIG. 1 illustrates the cross-section of a 1-zone and 2-zone climate control system, whereby the double line of the housing wall corresponds to a housing half 1. As air tempering devices, a fan, a filter (optional), an evaporator 2, a heater 3 and a PTC-heating element 4 are provided. These air tempering devices are arranged after each other in flow direction and, as clearly shown in FIG. 2, aligned generally parallel to each other to the longitudinal extension of the housing, or the housing halves 1, respectively. At a partition 6, not shown in FIG. 1, a central temperature door 5.2, a defroster door 5.1, a console door 5.3 and a rear compartment door 5.4 are arranged. The blind fittings, marked with the reference sign 6.1, in the upper region close the console outlet shown in FIG. 3 and in the lower region close the defroster outlet shown in FIG. 3, as well as the flow path for the rear heating.

Figure 2:
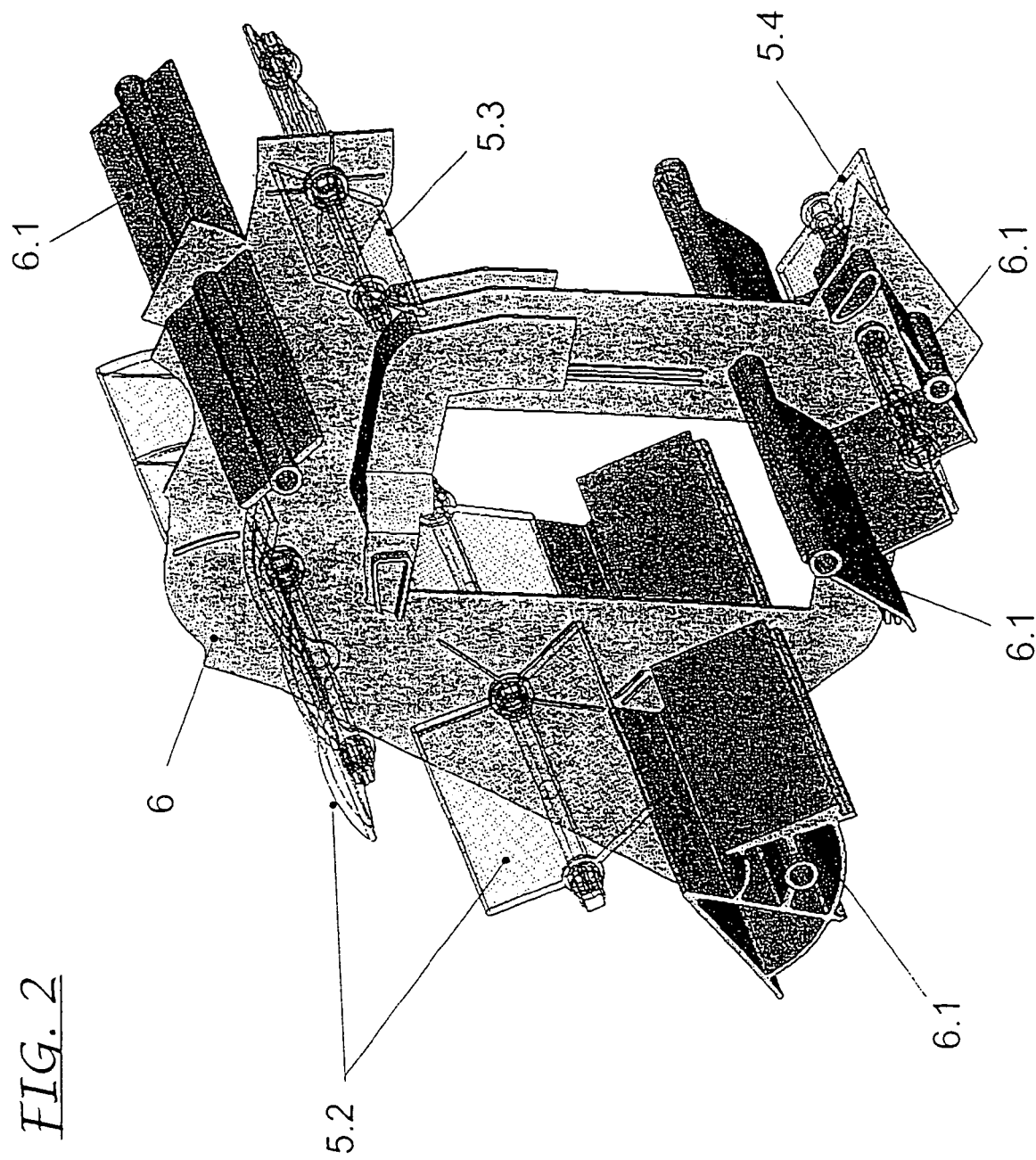
FIG. 2 is a perspective representation of a 1-zone and 2-zone climate control system with the housing removed.

FIG. 2 shows a perspective representation of a 1-zone and 2-zone climate control system without housing, or housing halves 1, respectively. The partition 6 is provided with an opening in which the heater 3 and the PTC-heating element 4 (both not shown in FIG. 2) are places orthogonal to the partition 6. In the region to the left (seen with the viewer) front side of the partition 6, the evaporator 2 shown in FIG. 1 will be located. As it is seen, the partition 6 is provided with several wing-like blind fittings 6.1 that are gained at the partition 6 and extend into the left and right housing halves. These blind fittings 6.1 are provided in pairs for the left and right housing halves 1 each and close the flow paths not needed for the 1-zone and 2-zone climate control systems. Orthogonal to the partition 6 the doors 5.1-5.4 are positioned each having a left and a right door wing configured symmetric to each other. The door wings can be adjusted to reach the required position by means of adjusting elements, not shown. Electronically controlled actors are preferred as adjusting elements. In the simplest case and adjusting elements are manually operatable. The door wings of the doors 5.1-5.4 are each supported and guided by means of a rotational axis thereof (only indicated), whereby each rotational axis extends between a housing half 1 and the partition 6. The axial ends of the rotational axes and the complementary support points at the partition 6 and the inner walls of the housing halves 1 are configured as common bearing. It is evident for any person familiar with the state-of-the-art that due to symmetric configuration of the doors 5 and the preferably symmetric configuration of both housing halves 1 of the climate control system the rotational axes have equal lengths.

Figure 4:
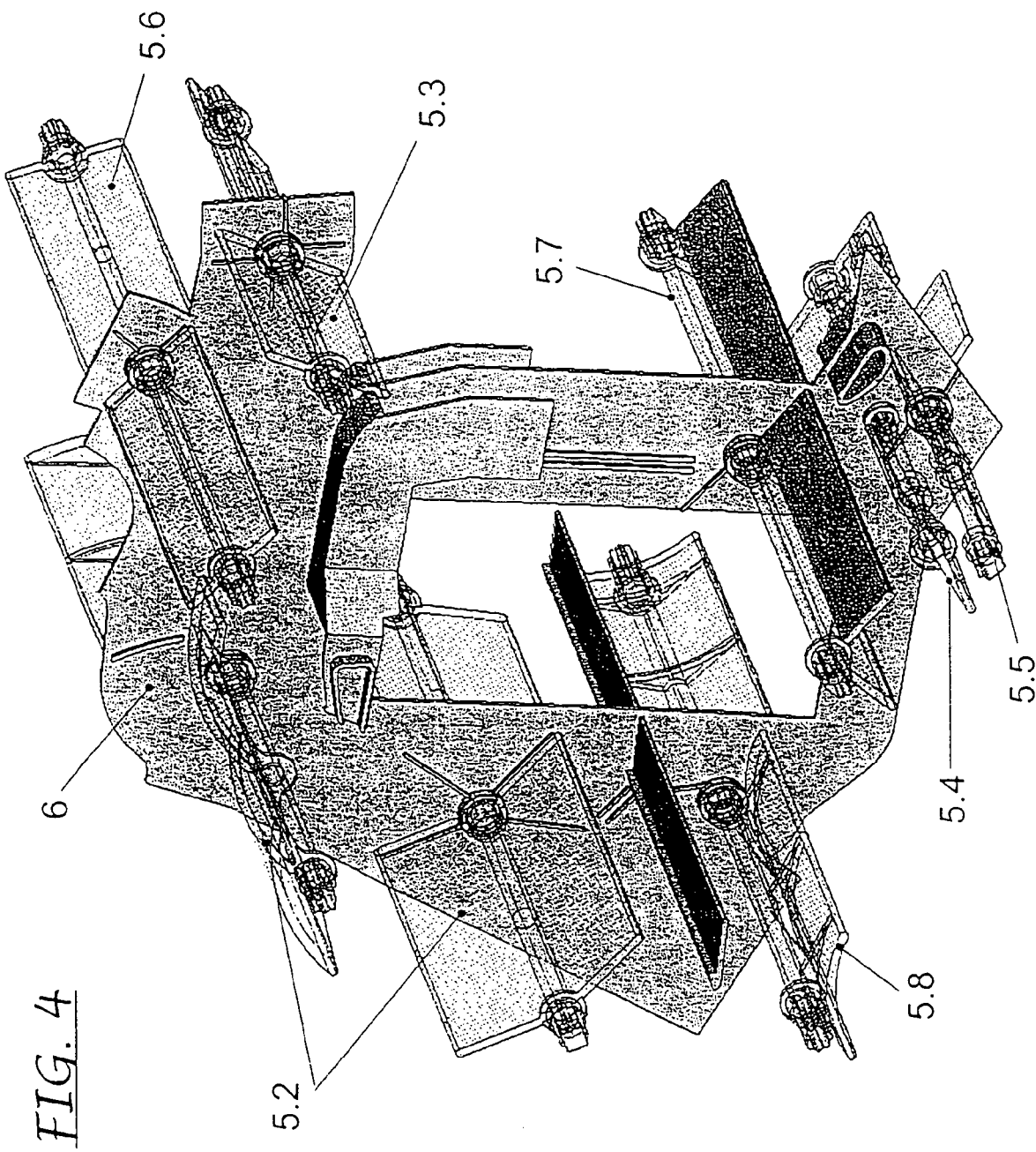
FIG. 4 is a perspective representation of a 3-zone and 4-zone climate control system with the housing removed.

According to the invention the housing, including two housing halves 1, of FIG. 1 can also be used for a 3-zone and 4-zone climate control system, shown in FIGS. 3 and 4. The basic structure of this climate control system is essentially identical to that of the previously described 1-zone and 2-zone climate control system. There are differences in the configuration of the partition 6 and the number of doors with the accompanying door bearings. In addition to doors 5.1-5.4, a rear compartment door 5.5, a console comfort door 5.6, a defroster bypass door 5.7 and a temperature door 5.8 for the rear compartment heating are provided. These doors 5.5 to 5.8 are placed a those positions where the blind fittings 6.1, shown in FIG. 1 and FIG. 2, closed the associated flow paths. On principle, the partition 6, as the partition 6 of the 1-zone and 2-zone climate control system, is as a compact component configured symmetric and therefore additionally supported midway between the two housing halves 1 (not shown). All doors 5.1-5.8 can be seen as having two door wings, one on each half 1, which can be adjusted independently of each other.

In the cross-sectional representation of FIG. 3, the arrangement of the individual doors 5.1-5-8 relative to each other, can be seen. Again the basic structure of the climate control system corresponds to that of FIG. 1, whereby instead of the blind fittings 6.1, a rear compartment door 5.5, a console comfort door 5.6, a defroster bypass door 5.7 and a temperature door 5.8 for the rear compartment heating to air condition 3 and 4 zones are used. It is seen that eight doors 5 per half are used in the example shown.

This invention is not restricted to a defined number of doors. The essence of this invention rather aims at enabling the use of as many equal components as possible within one single compact housing form of a climate control system.

The invention claimed is:

1. A system including exchangeable sets of parts for assembly of a modular 1 to 4 zone climate control device for a motor vehicle, the system comprising:
   a housing, an evaporator, a heater and a partition, the evaporator and heater and partition all being located within the housing and the partition dividing a total volume flow of the climate control device into two partial flows, one partial flow being for a left side of the vehicle and the other partial flow being for a right side of the vehicle;
   a plurality of doors located within the housing and being selectively movable to open and close air channels defined within the housing;
   a two exchangeable sets of parts, each set including a plurality of blind fittings and a plurality of additional doors; wherein
   the plurality of blind fittings being engagable with mounting features formed in at least one of the housing and the partition, the blind fittings being configured to close off additional flow paths associated with additional air channels and outlets; and
   the plurality of additional doors being engagable with the mounting features and configured to selectively open and close the additional air channels and outlets.

2. The modular system according to claim 1, wherein the plurality of doors includes a defroster door, a temperature door, a console door and a rear compartment door.

3. The modular system according to claim 1, wherein the mounting features are formed in the partition and the blind fittings are detachably fastened to the mounting features formed in the partition.

4. The modular system according to claim 1, wherein the blind fittings are formed as a portion of the partition.

5. The modular system according to claim 1, wherein each one of the plurality of doors and each one of the additional doors is provided as a pair of door wings located opposite each other on opposing sides of the partition, each pair of door wings being symmetric to one another and defining rotational axes for left and right sides of the vehicle, whereby each rotational axis is supported in the region of axial ends thereof with the mounting features of the housing and the partition.

6. The modular system according to claim 5 wherein individual ones of the pairs of the door wings are operatable independently of each other and rotatable relative to each other.

7. The modular system according to claim 5 wherein at least one pair of the door wings are coupled to each other and operable as a unit.

8. The modular system according to claim 7 wherein the at least one pair of the door wings is coupled by connection elements passed through openings in the partition.

9. A method of assembling a modular 1 to 4 zone climate control device, the method comprising:
   providing a housing, an evaporator, a heater and a partition, the evaporator and heater and partition all being located within the housing and the partition dividing a total volume flow of the climate control device into two partial flows respectively, for left and right sides of the vehicle, a plurality of doors located within the housing and being selectively movable to open and close air channels defined within the housing;
   a further providing one of two exchangeable sets of parts, the two exchangeable sets of parts including a plurality of blind fittings and a plurality of additional doors;
   a mounting one of the two exchangeable sets of parts in engagement with mounting features formed in at least one of the partitions and the housing; wherein
   the plurality of blind fittings are engagable with the mounting features, the blind fittings being configured to close off additional flow paths associated with additional air channels and outlets defined within the housing; and
   the plurality of additional doors are engagable with the mounting features and are configured to selectively open and close the additional air channels and outlets.

* * * * *

UNITED STATES PATENT AND TRADEMARK OFFICE
CERTIFICATE OF CORRECTION

PATENT NO. : 7,478,670 B2  Page 1 of 1
APPLICATION NO. : 11/173259
DATED : January 20, 2009
INVENTOR(S) : Gerald Richter et al.

It is certified that error appears in the above-identified patent and that said Letters Patent is hereby corrected as shown below:

<u>In the Claims</u>

In column 5, claim 1, line 59, delete "a" before "two exchangeable sets".

In column 6, claim 9, line 46, delete "a" before "further providing one".

In column 6, claim 9, line 49, delete "a" before "mounting one of the two exchangeable sets".

Signed and Sealed this

Twelfth Day of May, 2009

JOHN DOLL
*Acting Director of the United States Patent and Trademark Office*